United States Patent Office 3,319,680
Patented May 16, 1967

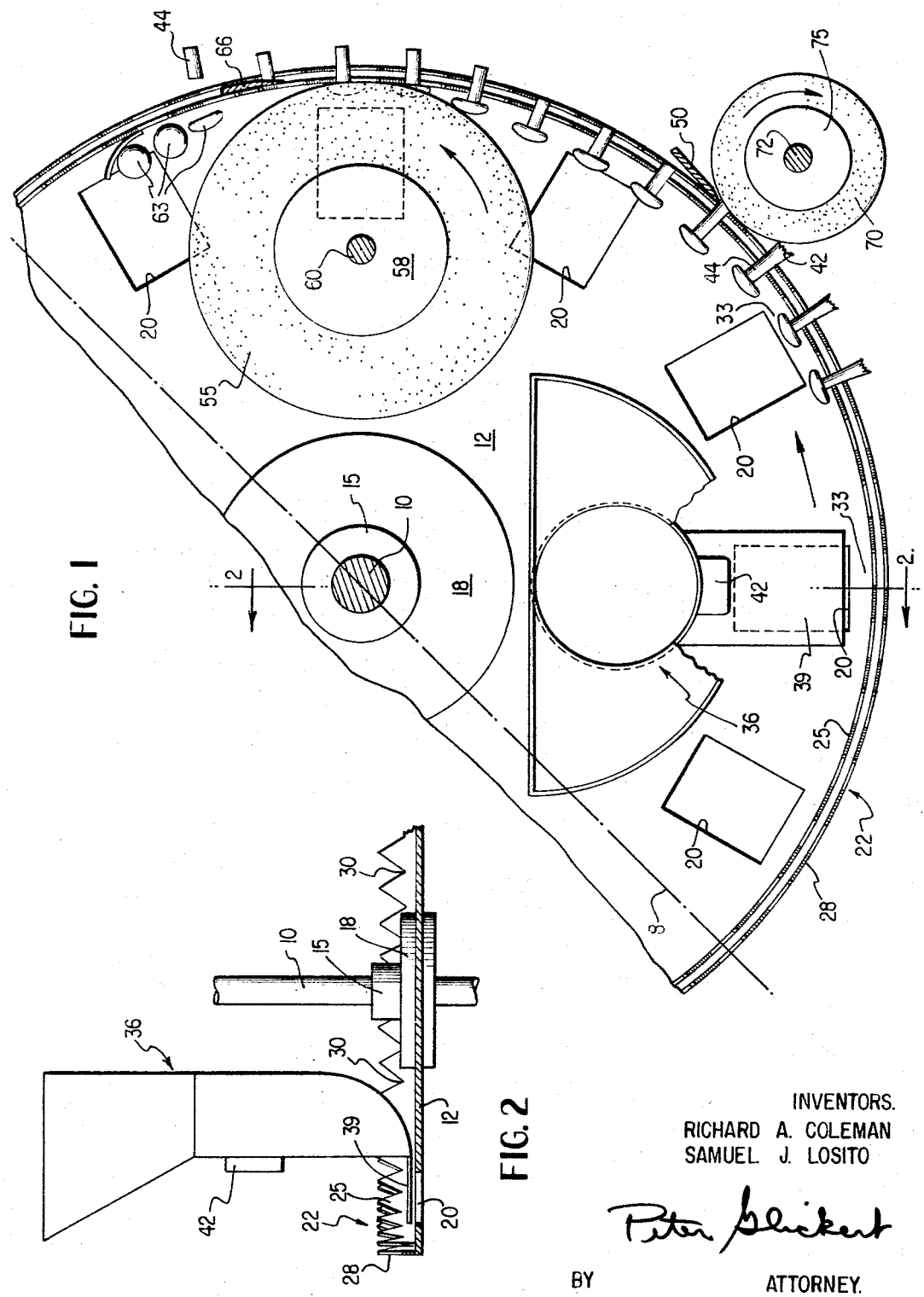

3,319,680
MUSHROOM TRIMMING MACHINE
Richard A. Coleman, Kennett Square, and Samuel J. Losito, Avondale, Pa., assignors to Vincent Losito and Sons, Toughkenamon, Pa., a partnership
Filed July 26, 1966, Ser. No. 567,868
6 Claims. (Cl. 146—81)

This invention concerns the trimming of mushrooms and like objects and provides a machine for such trimming having numerous advantages over machines for similar purposes heretofore proposed.

Mushrooms, as harvested, comprise a cap, a stem, and a flared root portion. To prepare these and certain other products for the consumer, the root portion must be removed, and also, in most cases, the cap is removed from the stem for separate canning or other processing. Mushrooms, as is well known, are soft, which often makes for difficult cutting and also must be handled quite delicately, if bruising, especially of the caps, is to be avoided. Accurate cutting of mushrooms, like other soft products, usually requires that each mushroom be individually held on both sides of the cutting tool during the cutting operation. To do this, while avoiding bruising, the art heretofore has adapted very complex mechanims to assure synchronous travel of the holding elements on either side of the mushroom cutter. Also, to make up for variations in size, various means have been adopted for nudging each mushroom into its proper place in the machine for each of the generally two cuts required. These means also have required elaborate drive machinery to assure a gentle "touch" and to assure synchronous travel.

In this invention such elaborate mechanical devices are eliminated by providing a movable support for the stem of a mushroom, the support being of such size that the end of the mushroom to be cut can overhang the support horizontally. Along the path of travel of the support is positioned a combination of a cutter and a horizontally rotatable resilient wheel. As the support passes adjacent this combination the wheel nudges the overhanging mushroom end into position and then holds the end while being cut. The material of which the wheel is made is firm enough to perform both of these operations while being soft enough to avoid bruising the mushroom. In this manner, the apparatus of this invention avoids the complex mechanical devices, cams, etc., previously believed necessary to hold and nudge the mushroom.

Advantageously, the resilient wheel is in frictional contact with the mushroom support at the cutting station, to assure synchronous travel of the entire mushroom in the cutting zone. Thus a need for separate drive pulleys, gears, etc., for the resilient wheels may be avoided. Preferably, two cutters may be provided, at a spaced interval along the path of travel of the mushroom support to provide for severence of both the root portion and the button from the stem.

In a preferred embodiment of this invention, a horizontal rotating disk is provided with an upstanding double outer edge which is serrated to provide a plurality of mushroom stem holding elements. Inside this upstanding edge, a wheel, made of a resilient material having special softness properties, as described, is provided. This wheel is advantageously driven by the inner member of the upstanding edge and contacts the portion of the mushroom to be cut off—usually the button portion—to nudge the mushroom outwards on the support and hold the button while it is being cut off by a cutting member operating between the two members of the upstanding edge. Another wheel, made of the same or substantially similar material as the first, may be provided to contact the outside of the upstanding edge at an earlier cutting zone where the root portion is removed. This wheel contacts the root of the mushroom to nudge the mushroom into root cutting position and hold the root while it is being cut off.

The wheel or wheels must have special characteristics to accomplish their function. They must be resilient and soft enough for the mushroom part to sink into, or at least be slightly depressed by the mushroom part which they contact in order not to bruise the mushroom. They must also, however, be stiff enough to nudge the mushroom into proper cutting position and hold it for cutting. Also, the wheel is usually made of a material having a coefficient of friction sufficiently high to be driven by the upstanding edge. It is highly desirable for the wheels to be water-resistant, that is, to be non-absorptive of water, so that they may be readily washed-down to preserve sanitary conditions.

It has been found that a certain type of flexible polyurethane foam is ideal as a material for the wheel although other materials may sometimes be used. Flexible polyurethane foam is a commercially available material usually sold for upholstery cushioning purposes. It is provided generally in three grades of softness, super soft, medium and extra-firm. The medium-firm material has proved excellent for fabrication of the wheels in this invention and is sometimes termed "medium-density," since softness in these products apparently varies with density. Specifications for the medium-firm polyurethane foam are a density of about 1.1 to 1.6 pounds/cubic foot; a tensile strength of about 12–20 p.s.i.; an elongation of about 190–260%; a tear strength of about 2–3 pounds per inch and a rebound resilience in the ball drop test of about 40–50%. The indentation load deflection for a 4-inch thickness of foam is as follows:

25%—24–30 pounds
65%—43–54 pounds
25% (unloading)—12–21 pounds
65/25 ratio 1.8

The apparatus and operation of this invention will be better understood by reference to the accompanying drawing which is to be considered illustrative only and in which FIGURE 1 is a top view of the mushroom trimmer of this invention in which the drive shaft and axles are shown in cross-section; and FIGURE 2 is a cross-sectional view along the line 2—2 in FIGURE 1.

In FIGURE 1 the center line 8 indicates how the apparatus illustrated comprises two complete mushroom trimming positions. In the figures, a vertical drive shaft 10 is fastened in operative relationship to the rotating horizontal disk 12 by any suitable means, such as the plates 15 and 18. The disk 12 is provided near its outer periphery with the holes or slots 20 and is adapted to rotate slowly, for example, about 5 r.p.m., in the counter-clockwise direction indicated by the arrow in FIGURE 1. The disk 12 is provided, preferably at its periphery with the upstanding edge 22 which, as shown, is composed of the inner member 25 and the outer member 28, both of which are serrated to provide the aligned notches 30. Each notch 30 provides a mushroom stem holder. The notches 30 may be cut sufficiently close to the disk 12 that the buttons of the mushrooms placed in the notches may rest on the disk 12, for example, along the outer portion 33 of the disk by having the holes 20 set back sufficiently from the edge 22 to provide space for the buttons to rest all around the periphery of the disk 12.

To simplify the task of placing the mushroom stems in the holders, the apparatus may be provided with the hopper 36 to which mushrooms may be fed and with the stationary feed apron 39 at the bottom of the hopper 36.

The hopper advantageously has a capacity of about 9 pounds which is the standard measure used in harvesting mushrooms. The hopper may be provided with the vibrator 42 to assure delivery of the mushrooms.

Advantageously the disc 12 is about 36 inches in diameter and provides 48 stemholding elements 30. A complete disc of this size provides two complete positions for manual operators, sitting each other at the disk, to place the mushroom stems in the notches, preferably with the button of the mushroom facing inwardly. The inner and outer members 25 and 28 of upstanding edge 22 are usually sufficient to allow the mushrooms to be somewhat balanced along their stems in the holders 30. As can be seen, the flared root portion 42 of a mushroom which is being held by its stem 44 overhangs the mushroom carrier horizontally; so that counterclockwise rotation of the disk 12 serves to carry the root portion 42 toward the cutting elements 50, which may be of any type known to the art; stationary, rotating, etc. Advantageously, the cutting element is a knife set at a scissors angle.

As can be seen from the drawing, a sponge wheel 55 is provided along the path of the mushrooms to be trimmed after the root cutting station. This wheel has the softness characteristics described above, and is held by the support member 58 for free rotation on the axle 60. As can be seen, this wheel 55 is on the inside of the edge 22 and serves to nudge the button 63 of the mushroom into contact with the inside member 25 of rim 22 and to hold the button while it is being severed from a stem portion 44 by the cutting means 66 which advantageously is located for operation between the members 25 and 28. Also, the sponge wheel 55 may be in frictional engagement with the inside member 25 of the edge 22 adjacent the cutting station. This frictional engagement assures synchronous travel by the stem and button of each mushroom as it is passing the cutter 66. Advantageously the sponge wheel 55 may be about 12 inches in diameter and about 3 inches thick. The cut stems may be allowed to fall from the outside of the edge 22 to a washing station while the buttons may fall through the slots 20 to a separate washing station.

If desired, another sponge wheel 70, which is free to rotate about the axle 72 and may be held in a horizontal position by the support member 75, may be provided adjacent, usually just before, the cutter 50. This sponge wheel will serve to nudge the root portion 42 of the mushroom into position for cutting, should a mushroom be placed in too-overhanging a position by the operator.

As previously explained, the center line 8 divides the apparatus shown into two complete cutting stations, other elements being arranged on the other side of this line identical to and advantageously symmetrical with the sponge wheels 55 and 70, cutters 50 and 66, etc.

It can readily be seen that by providing a resilient wheel moving at the same speed as the mushroom-stem holder, an end of the mushroom or like product can be gently nudged into cutting position and be synchronously held in this position during cutting. Also, by the use of sponge material according to this invention for the wheel, a frictional drive for the wheel and resulting synchronous travel of both stem and end of the mushroom can be readily assured without the need for complex driving mechanisms.

What is claimed is:

1. A mushroom trimming machine having a horizontally movable support for the stem of a mushroom, an end of the mushroom being able to overhang said support horizontally and a cutter for said end in combination with a horizontally arranged rotatable resilent wheel abutting said support adjacent said cutter and in a position to be rotated by frictional contact with said support, said wheel being soft enough to envelop said mushroom end without bruising it and contact said support in the presence of a mushroom end, yet firm enough to nudge said mushroom end into cutting position on said support and be frictionally driven by said support.

2. The apparatus of claim 1 in which said support is of such size that both ends of the mushroom will overhang said support, and in which two cutting stations are provided, spaced from each other along the path of travel of said support.

3. The apparatus of claim 2 in which said rotatable resilient wheel is frictionally rotatable by contact with said support adjacent the later of said cutting stations.

4. The apparatus of claim 1 in which the support is a notch in an upstanding edge of a disk rotating on a center distint from the axis of said wheel.

5. The apparatus of claim 4 in which said upstanding edge is a double edge with the said cutter located within the double edge.

6. The apparatus of claim 1 in which the said resilient wheel is mad of medium-density polyurethane foam.

References Cited by the Examiner

UNITED STATES PATENTS

| | | | |
|---|---|---|---|
| 1,872,889 | 8/1932 | Champlin et al. | 146—81 |
| 2,837,131 | 6/1958 | Fried | 146—81 |
| 2,936,013 | 5/1960 | Kirshner | 146—81 |
| 3,179,138 | 4/1965 | Norris | 146—81 |

FOREIGN PATENTS 830,998  3/1960  Great Britain.

WILLIAM W. DYER, Jr., *Primary Examiner.*

W. GRAYDON ABERCROMBIE, *Examiner.*